2,875,973
Patented Mar. 3, 1959

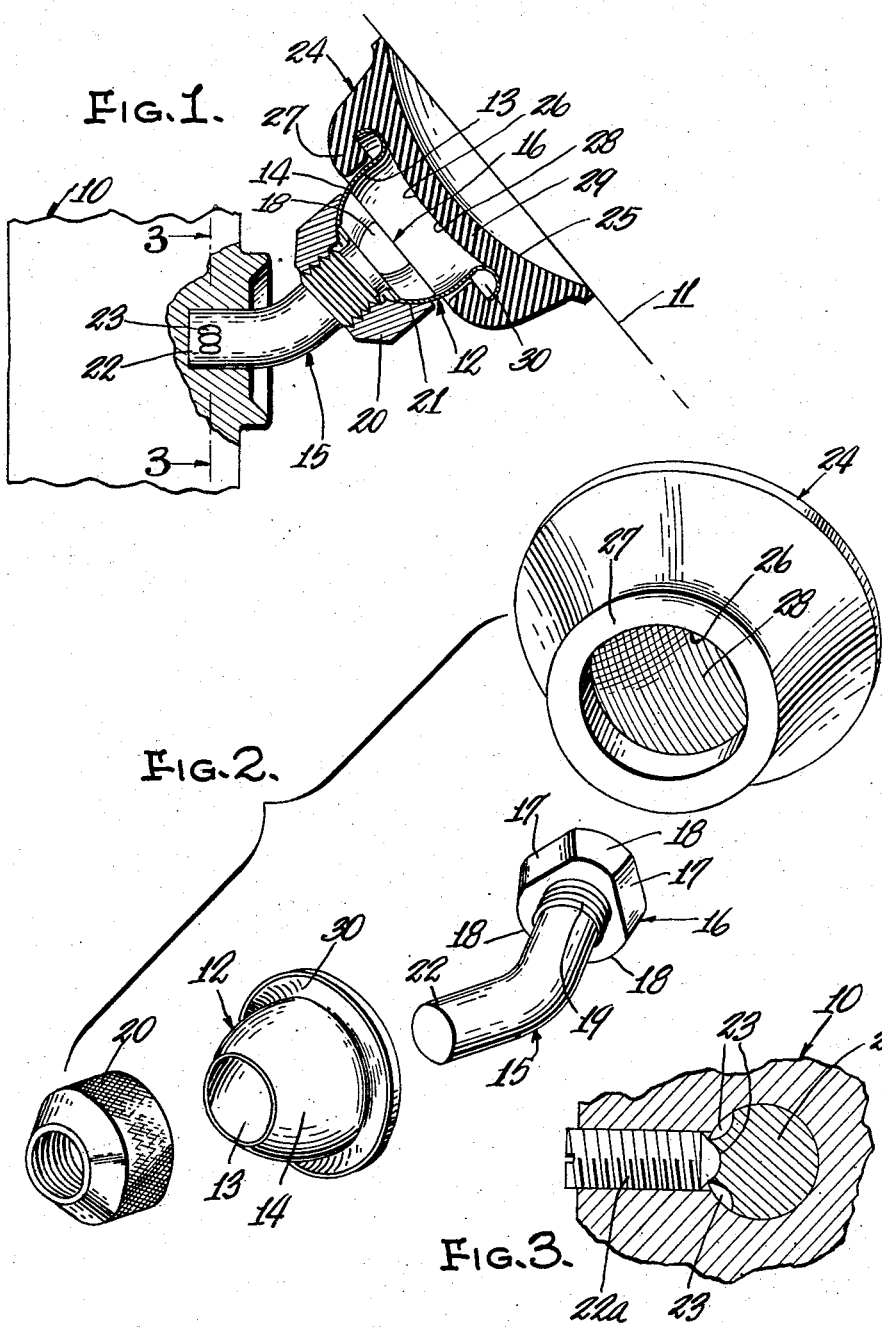

United States Patent Office

2,875,973
OBJECT SUPPORTING MEANS

Walter E. Hull, Cortland, Ohio, assignor to The Hull Manufacturing Company, a corporation of Ohio Application December 4, 1953, Serial No. 396,149

1 Claim. (Cl. 248—206)

The present invention relates to a bracket construction, more particularly to an adjustable bracket construction for use in securing a compass or like device to a supporting surface, and the principal object of my invention is to provide new and improved constructions of the character described.

In providing a bracket construction for mounting a compass or the like in an automobile, considerable difficulty has arisen in developing a construction which could be used equally well in all makes of automobiles and which would give the user the option of mounting the compass in a position best suited to his needs. Moreover, with today's wide-spread use of one-piece windshields, a heretofore almost universally satisfactory mounting support, the windshield dividing strip, has been eliminated completely in the majority of automobiles.

The present invention provides a bracket construction which is adapted to secure a compass or other device to any make automobile in whatever position best suits the user's needs. These and other advantages will become apparent from a study of the following description and from the drawing appended hereto.

In the drawing accompanying this specification and forming a part of this application there is shown, for purpose of illustration, an embodiment which my invention may assume, and in this drawing:

Figure 1 is a fragmentary sectional view of my improved bracket construction,

Figure 2 is an exploded perspective view of the bracket construction illustrated in Figure 1, and Figure 3 is an enlarged fragmentary sectional view corresponding generally to the line 3—3 of Figure 1.

As best shown in Figure 1, my invention comprises a bracket construction which is adapted to secure a compass or other device 10 to a suitable support which may be provided by an automobile or the like. In the presently disclosed embodiment, I prefer to support the compass from the windshield 11 of the automobile; however, it will be clear that the dash of the automobile or other suitable support may be employed if desired. The instant invention utilizes a novel ball and socket construction in combination with a novel suction cup to secure the compass 10 to the windshield 11.

As shown in the drawings, the ball and socket construction comprises a thimble-like hemispherical cup member 12 preferably formed of sheet metal or the like. As will be clear, the cup member 12 provides an inner semi-spherical concavity 13 and an outer semi-spherical convexity 14 coaxially arranged with respect to each other. An elongated stud member 15 has an enlarged head portion 16 formed for close engagement with the concavity 13 of the thimble-like member 12. In the present embodiment, and as best shown in Figure 2, the head 16 of the stud member 15 is formed as shown at 17 to provide a plurality (herein shown to be three) of circumferentially spaced-apart convex surfaces or arcuate portions 18 which are contoured to seat in the concavity 13.

The stud member 15 is threaded at 19 for engagement with a nut-like member 20 which has a concavity 21 in which the convexity 14 of the thimble-like member 12 is receivable. The elongated member 15 also has an outer portion 22 to which the compass 10, or other device, is adapted to be secured by any suitable means. In the present embodiment, the portion 22 is receivable within a bore formed in the compass 10 and is held in place by means of a set-screw 22a or the like which is adapted to seat in any one of (in this instance) three recesses 23 formed in the portion 22. The elongated member 15 is bent, as shown, to hold the compass at approximately the desired angle with respect to the windshield 11 and the three recesses 23 provide for adjustment of member 15 with respect to the compass.

The resilient rubber-like disc member or suction cup 24 has a dished suction face 25 which is adapted to grip any smooth surface, in the present instance the windshield 11, in a well-known manner. A recess 26 is formed in the body of the suction cup 24, the mouth of the recess 26 facing in the opposite direction relative to the dished face 25 as shown. A lip 27 overhangs the inner enlarged portion of the recess 26 for a purpose to be disclosed. In the presently disclosed embodiment, the bottom 28 of the recess 26 is so formed that it cooperates with the dished face 25 to provide a wall 29 of generally uniform thickness.

As best shown in Figure 1, the thimble-like member 12 is provided with a radially and outwardly extending rounded flange or outwardly curled lip portion 30 which is to seat in the recess 26 and held in assembled position by the lip 27 of the suction cup 24. However, it will be appreciated that the thimble-like member 12 could, if desired, be secured directly and mechanically to a supporting surface without employing the suction cup 24.

From the foregoing it will be clear that the elongated member 15, the thimble-like member 12, and the nut-like member 20 provide a ball and socket universal joint which is inexpensive to manufacture, highly efficient in operation, and which is easily locked in any selected position in a manner to be described.

In employing my improved bracket construction for mounting a compass or the like to a windshield of an automobile or other suitable supporting surface and assuming that the parts are assembled as shown in Figure 1, the dished surface 25 of the suction cup will preferably first be moistened in the usual manner with water or any other liquid such as a suitable cement. The suction cup will then be pressed against the windshield 11 to more or less flatten the dished face 25 in the usual manner so that the cup will firmly grip the windshield.

It should be pointed out that the herein disclosed suction cup has considerably more gripping power than those heretofore employed since the wall portion 29 of the cup is free of attachment to a rigid member and is accordingly flexible so that it flexes as the cup is pressed against the windshield. The usual suction cup heretofore employed for similar purposes had a center portion which was more or less rigidly held in place and which therefore could not flex freely and thus the gripping power of the cup was impaired.

After the suction cup has been attached to the windshield in the manner hereinbefore disclosed and after properly positioning and locking the portion 22 of the member 15 in the compass 10, the nut-like member 20 will be threaded along the member 15 to unclamp the thimble-like member 12 from between the nut member 20 and the head 16. The elongated member 15 will then be adjusted to any desired angle within its range of movement and the nut-like thimble member 20 once again tightened to firmly clamp the member 12 between the enlarged head 16 and the nut member 20. It should be pointed out that the three faces 18 which engage with the concavity 13 of the member 12 provide for high unit pressure therebetween so as to reduce the possibility of relative movement between the parts once the member 20 has been tightened.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only and that my invention is not limited thereto.

I claim:

A bracket assembly comprising a resilient rubber-like disc member having a concave portion at one side for suction engagement with a support and having an annular recess entering from the opposite side terminating in an annular undercut seat, a hemispherical cup having an annular outwardly curled lip seated and resiliently retained within said annular undercut seat, said cup also having a central opening through its closed end, a supporting stud extending through said opening and secured at one end to an object to be supported, the opposite end of said stud terminating in an enlarged disc-like head seated within said cup, said head having a plurality of peripherally spaced arcuate portions conforming to the curvature and engaging the inner surface of said cup at peripherally spaced localities to establish high unit pressure therebetween, the portion of said stud extending through said cup opening being threaded, and a nut threaded on said stud portion and having an interior spherical surface engageable with the exterior spherical surface of said cup for firmly clamping said cup between the nut and the stud head.

References Cited in the file of this patent

UNITED STATES PATENTS

| | | |
|---|---|---|
| 454,553 | Whitten | June 23, 1891 |
| 596,207 | Hart | Dec. 28, 1897 |
| 945,074 | Bagley | Jan. 4, 1910 |
| 1,753,611 | Lower | Apr. 8, 1930 |
| 1,892,140 | Fogler | Dec. 27, 1932 |
| 2,146,859 | Seklehner | Feb. 14, 1939 |
| 2,527,899 | Valasek | Oct. 31, 1950 |
| 2,624,537 | Rouy | Jan. 6, 1953 |
| 2,634,077 | Van Dusen | Apr. 7, 1953 |
| 2,648,256 | Budreck | Aug. 11, 1953 |
| 2,650,870 | Carpenter | Sept. 1, 1953 |
| 2,670,914 | Jones | Mar. 2, 1954 |

FOREIGN PATENTS

| | | |
|---|---|---|
| 582,072 | Great Britain | Nov. 4, 1946 |